(12) United States Patent
Bollmann et al.

(10) Patent No.: US 7,702,312 B2
(45) Date of Patent: Apr. 20, 2010

(54) CAR TELEPHONE SYSTEM

(75) Inventors: Eckhard Bollmann, Hullhorst (DE); Trevor Wilson, Crewe (GB)

(73) Assignees: Bury Sp. z.o.o, Mielec (PL); Bentley Motors Limited, Cheshire (GB)

( * ) Notice: Subject to any disclaimer, the term of this patent is extended or adjusted under 35 U.S.C. 154(b) by 430 days.

(21) Appl. No.: 11/425,178

(22) Filed: Jun. 20, 2006

(65) Prior Publication Data
US 2007/0142095 A1 Jun. 21, 2007

(30) Foreign Application Priority Data
Jun. 21, 2005 (DE) .................. 10 2005 029 690

(51) Int. Cl.
*H04M 1/00* (2006.01)
(52) U.S. Cl. .................. 455/406; 343/713; 235/380; 701/1
(58) Field of Classification Search .......... 455/406, 455/552.1; 343/13, 137; 235/380; 701/1
See application file for complete search history.

(56) References Cited

U.S. PATENT DOCUMENTS

| 4,184,161 | A | * | 1/1980 | Scarbrough, Jr. ............ 343/713 |
| 5,649,316 | A | | 7/1997 | Prudhomme et al. ........ 455/345 |
| 6,158,655 | A | * | 12/2000 | DeVries et al. ............. 235/380 |
| 6,490,443 | B1 | * | 12/2002 | Freeny, Jr. .................. 455/406 |
| 6,526,335 | B1 | * | 2/2003 | Treyz et al. .................... 701/1 |
| 2001/0021640 | A1 | | 9/2001 | Lappe ......................... 455/41 |
| 2003/0224840 | A1 | | 12/2003 | Frank et al. .............. 455/575.9 |

* cited by examiner

*Primary Examiner*—William D Cumming
(74) *Attorney, Agent, or Firm*—Whitham Curtis Christofferson & Cook, PC

(57) ABSTRACT

A car telephone system having a telephone module (3) which has a telephone transmitting and receiving unit (5), can be connected to a transmitting and receiving antenna (7), can be connected to a central control bus (1) of the vehicle and can be controlled by a central controller (2) via the control bus (1) enables telephone operation, via the telephone module (3), using user-specific data from a mobile telephone (9) by virtue of the fact that the telephone transmitting and receiving unit (5) is provided with a wireless data and signal transmission unit (6) which can be used to transmit user-specific data from a mobile telephone (9) to the telephone transmitting and receiving unit (5), and by virtue of the fact that the telephone transmitting and receiving unit (5) is also connected to a separate card reader (11) for a memory card which contains the user-specific data from the mobile telephone (9).

7 Claims, 3 Drawing Sheets

CAR TELEPHONE SYSTEM

FIELD OF THE INVENTION

The invention relates to a car telephone system having a telephone module which has a telephone transmitting and receiving unit, can be connected to a transmitting and receiving antenna, can be connected to a central control bus of the vehicle and can be controlled by a central controller of the vehicle via the control bus.

BACKGROUND OF THE INVENTION

Car telephone systems whose operation and control are integrated in a central unit for also controlling a car radio, a navigation system, an onboard computer etc. are installed, in particular, in vehicles of higher quality. This central operating and control unit is regularly connected to the corresponding devices via an electronic control and communication bus of the vehicle. This control bus is also used to transmit vehicle-relevant and safety-relevant data, for example signals which reflect actuation of the accelerator pedal or brake pedal.

It is known practice to provide the telephone system with its own telephone which is connected to a vehicle antenna and to a microphone which is installed in the vehicle and to loudspeakers in order, in this manner, to make it possible to make a telephone call in the hands-free mode, i.e. without the need to hold the telephone. A system of this type is very complicated and regularly requires the car telephone to be registered as a further mobile telephone in addition to a portable mobile telephone which the car user generally already has with him. Some mobile radio providers make it possible for the installed car telephone to be used with a second card which belongs to the contract for the portable mobile telephone, so that the calls which are made using the car telephone can be invoiced using the contract which has been concluded for the portable mobile telephone.

It is known practice, in particular for car telephone systems which can be retrofitted, to install a telephone control box in the vehicle and to connect the latter to a holder into which a portable mobile telephone can be inserted. In this case, the holder may be designed in such a manner that it connects the mobile telephone to a vehicle antenna, so that the antenna on the mobile telephone can remain switched off when making a telephone call. The call is then handled using the mobile telephone which has been inserted into the holder. Since this uses a relatively large amount of power from the rechargeable battery of the mobile telephone, the holders are regularly provided with a charging device for the mobile telephone.

Use is increasingly being made of mobile telephones which have a transmitting and receiving device for data and audio signals, transmission generally being effected in accordance with a wireless communication standard, the BLUETOOTH® standard (BLUETOOTH® is a registered trademark of Bluetooth SIG, Inc.). If the control box which has been installed in the vehicle and the mobile telephone each have a transmitting and receiving device of this type, the function of the mobile telephone can be controlled by the control box or by the central operating device of the vehicle by virtue of the control signals being transmitted to the mobile telephone via the wireless connection. Conversely, audio signals are wirelessly transmitted from the mobile telephone and allow the telephone call to be made via the transmitting and receiving device of the mobile telephone but using the appropriate devices in the vehicle, for example a hands-free device or a headphone/microphone set. The audio signals are transmitted using the BLUETOOTH® wireless communication standard, thus with a HFP (Hands Free Profile) signal or a HSP (Head Set Profile) signal. This solution is convenient since there is no need to provide a holder for the mobile telephone and corresponding installation in the vehicle can be omitted. However, the disadvantage is that the transmitting and receiving device of the mobile telephone is used with the antenna of the mobile telephone, with the result that a certain intensity of the transmitted radiation occurs in the vehicle interior. It is also disadvantageous that the current loading on the mobile telephone is high in this mode, with the result that more attention must be paid to the state of charge of the mobile telephone which often does not occur in practice.

SUMMARY OF THE INVENTION

The present invention is based on the object of forming a car telephone system of the type mentioned initially in such a manner that it can be used without concluding a separate mobile radio contract and enables different types of mobile telephone to be handled in a convenient manner.

In order to achieve this object, a car telephone system of the type mentioned initially is characterized, according to the invention, in that the telephone transmitting and receiving unit is provided with a wireless data and signal transmission unit which permits the reception of user-specific data from a mobile telephone to the telephone transmitting and receiving unit, and in that the telephone transmitting and receiving unit is also connected to a separate card reader for a memory card which contains the user-specific data from the mobile telephone.

The car telephone system according to the invention thus provides for the user-specific data from the mobile telephone, which also includes the data for accessing the mobile radio network, to be wirelessly transmitted from the mobile telephone to the telephone transmitting and receiving unit. This possibility is known, in principle, and is regularly effected in accordance with a standard, the rSAP standard. In this case, the telephone function of the transmitting mobile telephone is switched off as soon as the telephone transmitting and receiving unit which receives the user-specific data has registered with the mobile radio network with these data. As long as the wireless connection exists between the telephone transmitting and receiving unit and the mobile telephone, all outgoing and incoming calls are thus handled using the telephone transmitting and receiving unit of the telephone module. In this case, the wireless connection (BLUETOOTH® standard) to the mobile telephone is used only to access user-specific data on the corresponding memory card (SIM card) of the mobile telephone.

If the telephone module of the car telephone system according to the invention thus communicates with a mobile telephone which permits the reception of user-specific data including access data in accordance with the rSAP standard, for example, the telephone module will receive these data and will register with the mobile radio network with these data. As long as the mobile telephone is in the communication range for wireless communication (BLUETOOTH®), the telephone module of the car telephone system remains active. If the mobile telephone is removed from the communication range of the telephone module, the telephone module cancels its registration, with the result that the portable mobile telephone is activated again.

The present invention takes into account the fact that only a certain proportion of the mobile telephones on the market are capable of wirelessly transmitting the user-specific data to another telephone transmitting and receiving unit (rSAP capability). Therefore, the car telephone system according to the invention provides a separate card reader for a memory card (SIM card) which contains the user-specific data from the mobile telephone. In this case, the card reader is arranged separately from the telephone transmitting and receiving unit and thus makes it possible for the card reader to be positioned within the driver's reach. The telephone module having the telephone transmitting and receiving unit is regularly out of the driver's reach because, in vehicles of higher quality, in particular, a very large number of devices and operating elements are accommodated within the driver's reach and placement options which are more favorable for the telephone transmitting and receiving unit 5 are present in the vehicle, for example in the region of the rear window 12 (as shown in FIG. 2) where the telephone transmitting and receiving unit can be conveniently connected to a vehicle antenna which is integrated in the rear window, for example. The card reader arrangement which is provided separately from the telephone module makes it possible for said card reader 11 to be placed, for example, in the center console 13 between front seats of the vehicle (as shown in FIG. 3) where the corresponding SIM card is readily accessible and can nevertheless be inserted into the card reader such that it is mechanically protected.

In this case, the distance between the card reader and the telephone transmitting and receiving unit is greater than 1 m and may even be approximately 3 m. In this case, the requisite error-free transmission of the user-specific data, in particular of the data for accessing the mobile radio network, requires the data to be carefully preprocessed in the card reader so that said data may also be transmitted in an error-free manner in the case of disturbing influences.

Communication (which is provided according to the invention) between the telephone transmitting and receiving unit and the mobile telephone, for example using the BLUETOOTH® standard, requires an acquaintance step ("pairing"). Pairing must be initialized from the telephone transmitting and receiving unit, so that it is necessary to control the telephone module. The telephone module is controlled via the central control bus. One special feature of communication (which is extremely relevant to safety) via the control bus of the vehicle is that only those signals which, according to their type, have been agreed up to the end of development of the control bus are allowed to be passed and can be passed via the control bus. Therefore, the control signals which are needed to control BLUETOOTH® data communication are regularly not provided for in the control bus of a vehicle type. However, a requisite change to the agreed communication on the control bus would require a high level of outlay since the change to the communication on the control bus cannot be enabled until detailed tests have been carried out in order to determine whether safety-relevant functions of the vehicle (braking operation or the like) are not impaired by said change. In order to avoid this outlay, the invention therefore provides for a separate control unit to be directly connected to the telephone transmitting and receiving unit in order to thus make it possible to organize wireless communication between the telephone transmitting and receiving unit and the mobile telephone. This process of organizing communication includes the operations of carrying out pairing and assigning an identification code for that mobile telephone for which pairing has already been carried out. The separate control unit must also detect whether a mobile telephone which has already been "paired" with the telephone transmitting and receiving unit can be found within the communication range and which mobile telephone has priority if a plurality of mobile telephones which are assigned to the telephone transmitting and receiving unit in question are in the communication range. A priority for a manually inserted SIM card is also allocated for the control unit so that, when a SIM card is inserted into the card reader, rSAP communication with mobile telephones is prevented. If a SIM card has not been inserted into the card reader, the control unit will see to it that the telephone transmitting and receiving unit looks, in the communication range, for mobile telephones with which a wireless data communication link can be established.

The separate card reader may preferably be accommodated in the separate control unit. The latter may thus also be installed in the center console of the vehicle, for example.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
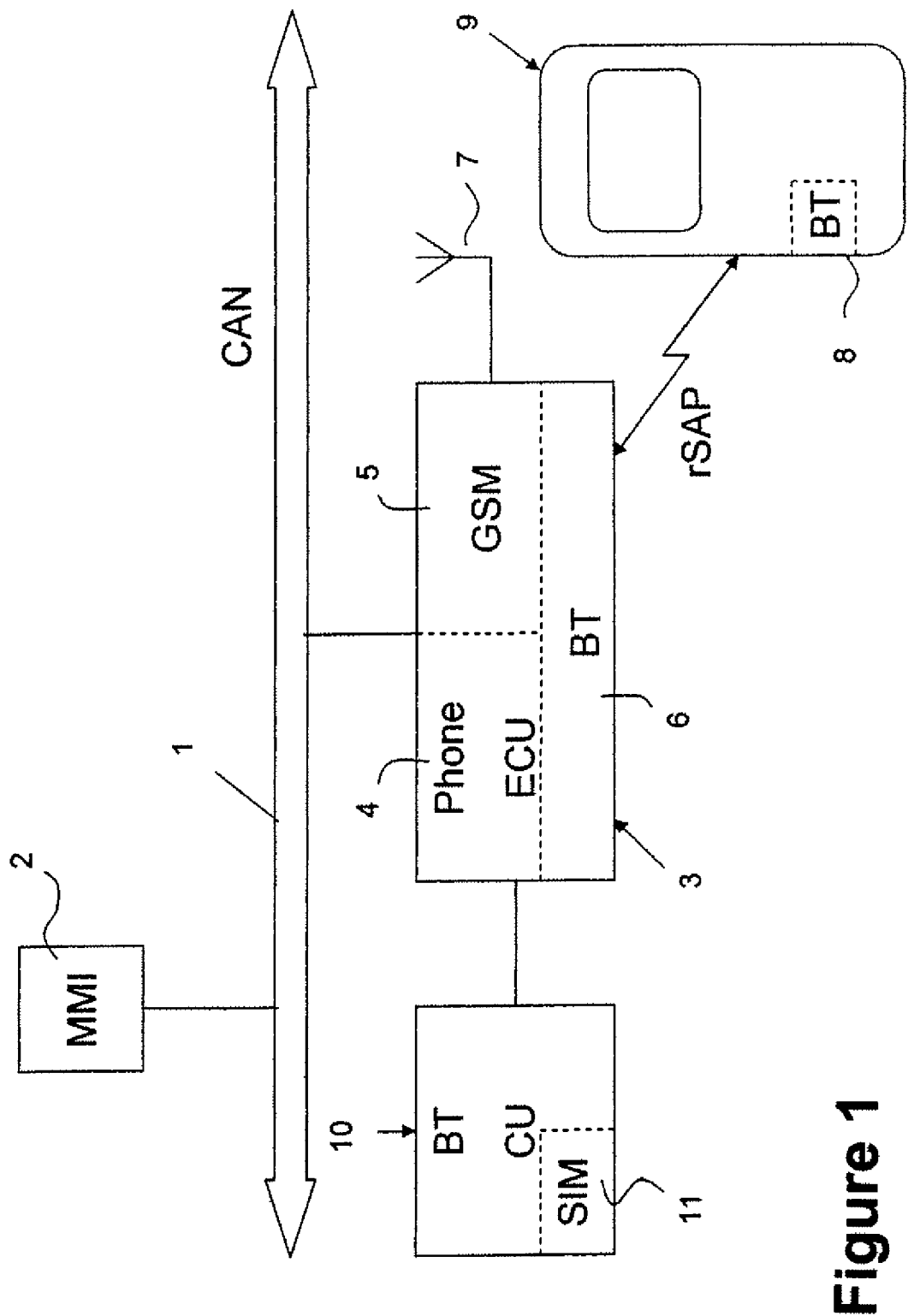
FIG. 1 is a diagram schematically showing a car telephone system.
Figure 2:
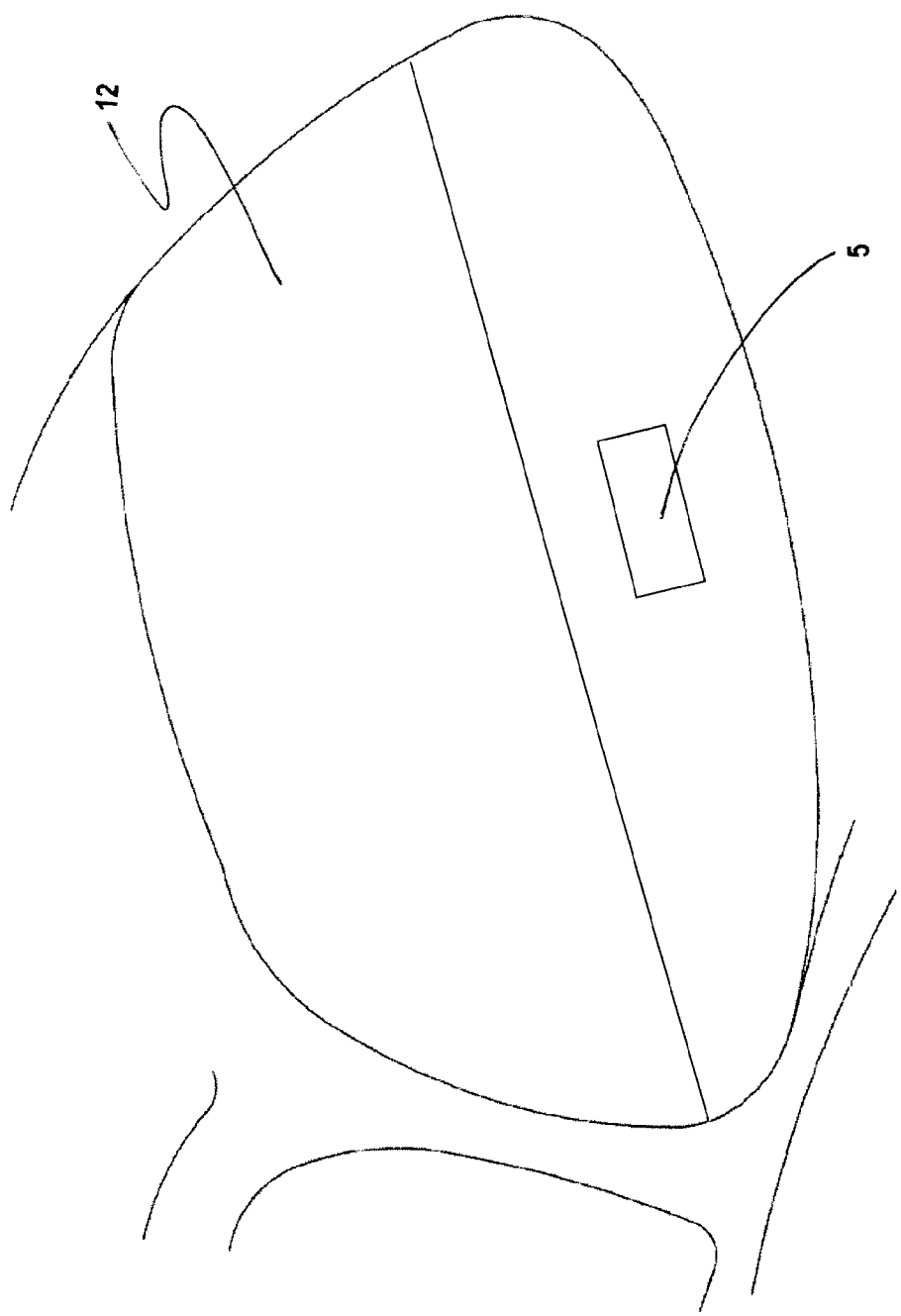
FIG. 2 is a perspective view of the rear window of a vehicle with the telephone transmitting and receiving unit of the present invention.
Figure 3:
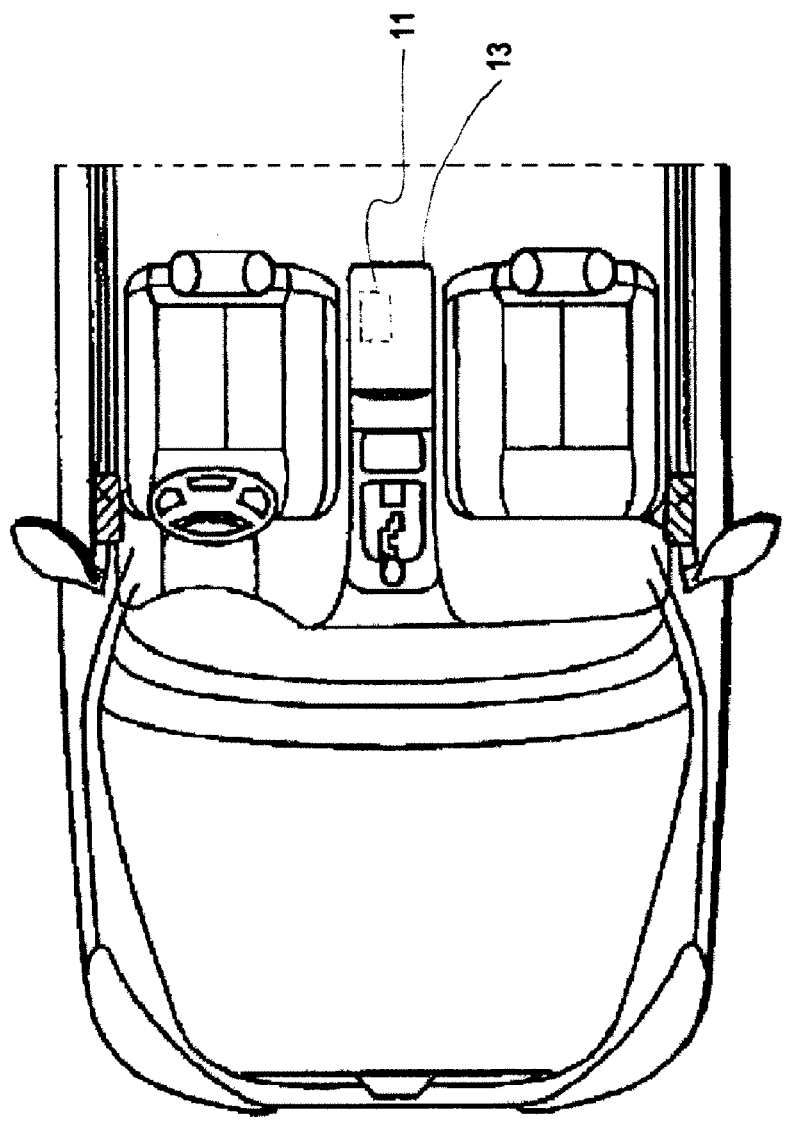
FIG. 3 is a top perspective view of the front seats of a vehicle with a separate card reader in a center console in accordance with the present invention.

One exemplary embodiment of the invention is diagrammatically illustrated in the accompanying drawing.

A central controller 2 (MMI) is connected as a central infotainment controller to a central control bus 1 which is generally a CAN bus. A telephone module 3 having an electronic telephone control unit 4, a telephone transmitting and receiving unit 5 (GSM) and a wireless data and signal transmission unit 6 (BT) is controlled via the control bus 1. The telephone transmitting and receiving unit 5 is connected to a vehicle antenna 7.

The wireless data and signal transmission unit 6 can communicate with a corresponding wireless data and signal transmission unit 8 of a portable mobile telephone 9 and can interchange user-specific data in accordance with the rSAP standard. Wireless communication between the wireless data and signal transmission units 6 and 8 requires "pairing" which is controlled by a separate control unit 10 which is connected to the telephone module 3. If the user-specific data from the mobile telephone 9, which are stored on a SIM card of the mobile telephone, have been transmitted to the telephone module 3, telephone operation now takes place exclusively via the telephone module 3 of the car telephone system. However, the rSAP communication link to the mobile telephone 9 is maintained, for example in order to be able to fall back on further specific data on the SIM card of the mobile telephone 9. The constant communication link between the telephone module 3 and the mobile telephone 9 also represents the criterion that telephone operation can be handled using the telephone module 3. If the mobile telephone 9 is removed from the communication range of the telephone module 3, the registration of the telephone module 3 in the mobile radio network is canceled, with the result that further telephone operation is then possible only using the mobile telephone 9.

Since a large number of portable mobile telephones which do not have rSAP capability are on the market, the control unit 10 has a card reader 11 for SIM cards. Said card reader makes it possible, in particular, to use so-called twin cards. In this case, for a mobile radio contract, two cards are issued for the same telephone number and the same data for accessing the mobile radio network. If a second card is inserted into the card reader 11, the telephone module 3 is thereby activated and deactivates associated mobile telephones via the mobile radio network so that operation which is, in principle, similar is possible using mobile telephones which do not have rSAP capability, as described above.

For mobile telephones which, although they have been set up for BLUETOOTH® transmission, do not have rSAP capability, that is to say cannot transmit the user-specific data, the telephone system described can also be used in such a manner that a telephone call is made in the Hands Free Profile or in the Head Set Profile using the mobile telephone but via the telephone module 3 as a hands-free system. In this case, the audio signals and associated control signals are transmitted via the BLUETOOTH® connection.

The invention claimed is:

1. Car telephone system, comprising:
   a telephone module which has a telephone transmitting and receiving unit which has a connection to a transmitting and receiving antenna and to a central bus of the vehicle;
   a central controller controlling said telephone module through said control bus, wherein
      a wireless data and signal transmission unit in said telephone transmitting and receiving unit is provided by which the telephone transmitting and receiving unit receives user-specific data from a mobile telephone so as to perform a mobile telephone communication through a mobile radio network using the access data of said mobile telephone; and
   a separate card reader reads user-specific data from a memory card of the mobile telephone inserted into the card reader in order to perform a mobile telephone communication by means of the telephone module through the mobile radio network using the access data of said mobile telephone.

2. Car telephone system according to claim 1, wherein said separate card reader is arranged at a distance of >1 m from said telephone transmitting and receiving unit.

3. Car telephone system according to claim 1, wherein said telephone transmitting and receiving unit is arranged in a region of a rear window of a vehicle.

4. Car telephone system according to claim 1, wherein said separate card reader is arranged within a vehicle driver's reach.

5. Car telephone system according to claim 4, wherein said separate card reader is arranged in a region of a center console between front seats of a vehicle.

6. Car telephone system according to claim 1, wherein a separate control unit is directly connected to said telephone transmitting and receiving unit and organizes wireless communication between said telephone transmitting and receiving unit and said mobile telephone.

7. Car telephone system according to claim 6, wherein said separate control unit is provided with said separate card reader.

* * * * *